March 19, 1929.  E. S. MARKOVETZ  1,706,242
INTAKE MANIFOLD HEATER
Filed May 31, 1927

Inventor
E. S. Markovetz,
By Clarence A. O'Brien
Attorney

Patented Mar. 19, 1929.

1,706,242

UNITED STATES PATENT OFFICE.

EDWARD S. MARKOVETZ, OF BEEBE, SOUTH DAKOTA.

INTAKE-MANIFOLD HEATER.

Application filed May 31, 1927. Serial No. 195,381.

My invention relates to intake manifold heaters for internal combustion engines and has for its object to provide a heat retaining element interposed in the fuel mixer feed line between the carbureter and intake manifold of the engine and having an auxiliary exhaust pipe extending therethrough whereby the heat caused by the running of the motor will serve to heat the fuel before the same is fed into the engine.

A further object is to provide an air compartment within the fuel heater through which the auxiliary exhaust pipe from the motor is adapted to extend, and to provide a valve arrangement for supplying air to said compartment and operated by the suction force of the motor whereby the heated air within the compartment may be mixed with the fuel and be fed into the motor thereby providing a more readily combustible mixture.

Another object is to provide a device of this character which may be easily and quickly installed in operative position upon a gas engine, which does not include any moving parts thereby eliminating the possibility of the device from becoming out of adjustment and thus failing to properly function, which is simple in construction, and relatively inexpensive to manufacture and install.

Figure 1:
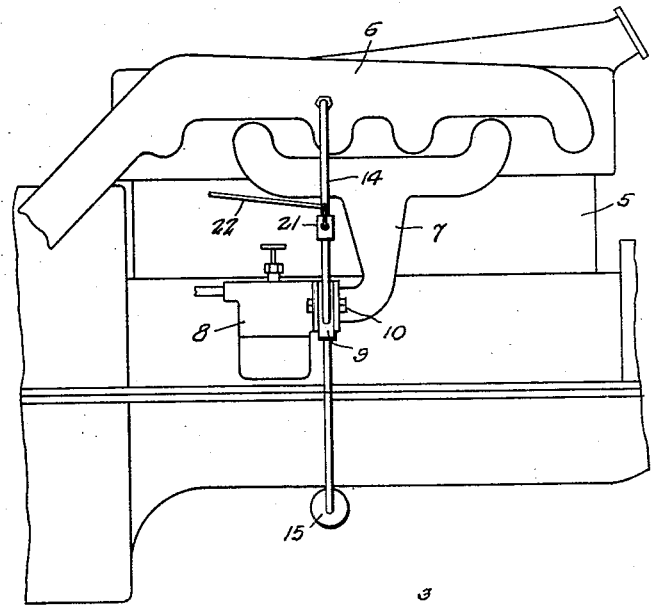
Figure 2:
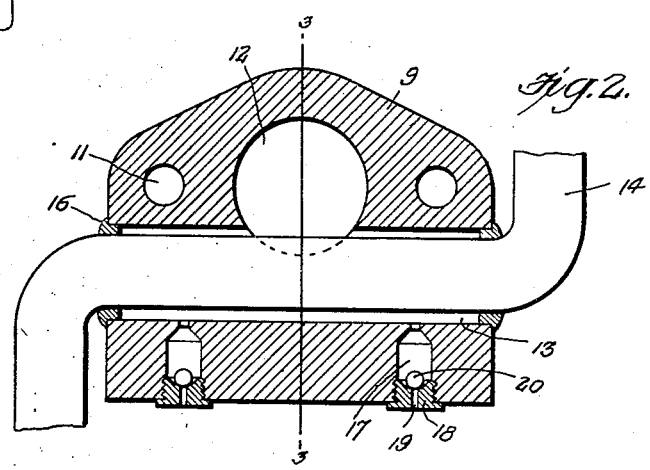
Figure 3:
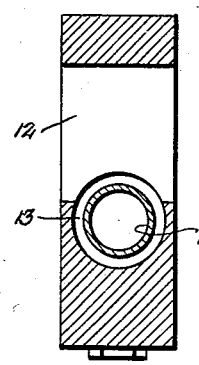
Figure 4:
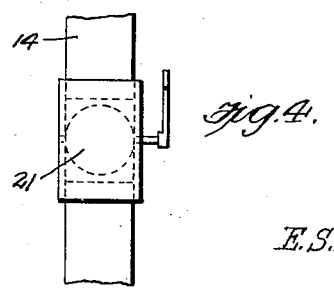

Other objects and advantages reside in the special construction, combination and arrangement of parts forming the invention as more fully hereinafter described and claimed, reference being had to the accompanying drawings, forming part hereof, wherein:

Figure 1 is a side elevational view of a gas engine showing my invention in operative position thereon, Figure 2 is a vertical sectional view through the gas saver, Figure 3 is a transverse sectional view taken substantially along the line 3—3 of Figure 2, and Figure 4 is a detail of the cut-off valve for the auxiliary exhaust used for supplying heat to the gas heater.
In the present embodiment of the invention I have shown the same adapted for use in connection with a gas engine indicated at 5 having the conventional type of exhaust manifold 6 and intake manifold 7.
The carbureter 8 is also shown attached to the intake manifold for mixing and feeding the fuel to the engine.

My invention comprises a fuel heater in the form of a block 9 interposed in the fuel feed line between the carbureter and intake manifold and firmly secured in position thereto by bolts 10 or the like arranged transversely through openings 11 formed in the block. The block is also provided with an enlarged transversely arranged opening 12 through which the fuel from the carbureter extends through the block into the intake manifold. A longitudinally arranged bore 13 is formed in the block beneath the opening 12 and including the lower portion of said opening in its area so that the bore and the opening are in constant communication with each other.

An auxiliary exhaust pipe 14 is connected at one end with the main exhaust manifold 6 and extends through the bore 13 in spaced relation therefrom and has its opposite end provided with a relatively small muffler 15. Each end of the bore is provided with a plug 16 whereby to seal the ends of the bore and to support the pipe 14 in spaced relation from the walls of the bore in order to form an air space thereabout. In the lower portion of the block I provide upwardly extending apertures 17 communicating with the air chamber formed by the bore 13 and having the lower ends of said apertures provided with plugs 18 having an air passage 19 provided therethrough, the inner ends of said plugs being formed into a valve seat upon which ball valves 20 are adapted normally to rest.

A cut-off valve is interposed in the exhaust pipe 14 between the exhaust manifold 6 and the gas heater and may comprise a butterfly valve 21 having a rod 22 operatively connected therewith and extending to the instrument board of the automobile.

It will be noted from Figure 2 of the drawings that the exhaust pipe 14 is of sufficient diameter to cover the lower portion of the opening 12 formed in the block 9 and it is obvious from such construction that as the gas passes from the carbureter through the block into the intake manifold that the same will be affected by the heated exhaust pipe 14. Likewise, the air heated within the compartment formed by the bore 13 will be mixed with the gas as the same passes through the block into the intake manifold. The suction effect of the motor operating to draw the gas and air into the cylinders thereof will also operate to draw the ball valve 20 upwardly to permit the air within the compartment to be replenished. Any suitable number of these ball valves may be provided in the lower portion of the block.

It is obvious that the invention is susceptible to various changes and modifications without departing from the spirit thereof or the scope of the appended claim and I accordingly claim all such forms of the device to which I am entitled.

I claim:

A fuel heater for engines comprising a body member interposed in the fuel intake pipe of the engine and having an air compartment and a fuel passage formed therein, said compartment and passage having free communication with each other, said compartment also having air intake passages communicating therewith provided with suction control valves operable by the engine for admitting air into said compartment, a heat radiating member extending throughout the length of the compartment in spaced relation from the walls thereof and outwardly of the opposite ends of the body and a pair of plugs inserted in the ends of the compartments having openings through which to receive said member for forming an air tight seal between the walls of the member and the ends of the compartment and adapted for supporting the walls of the member in spaced relation with the walls of said compartment.

In testimony whereof I affix my signature.

EDWARD S. MARKOVETZ.